United States Patent

Wade

[15] 3,666,890

[45] May 30, 1972

[54] DIFFERENTIAL CODING SYSTEM AND METHOD

[72] Inventor: Fred B. Wade, Ventura, Calif.

[73] Assignee: American Data Systems, Inc., Canoga Park, Calif.

[22] Filed: Nov. 27, 1970

[21] Appl. No.: 93,429

[52] U.S. Cl. ......................179/15 AP, 179/15 BC, 325/38 A, 340/347 DA

[51] Int. Cl. ..............................................................H04j 3/04

[58] Field of Search .................179/15 AP, 15 BC; 325/38 A; 340/347 R, 347 DA, 347 DD, 347 DF

[56] References Cited

UNITED STATES PATENTS 3,569,955 3/1971 Maniere ...........................325/38 A X
3,587,088 6/1971 Franaszek ......................340/347 DD
3,588,880 6/1971 Gross .............................340/347 DA
3,611,141 10/1971 Waters ............................325/38 A X

*Primary Examiner*—Ralph D. Blakeslee
*Attorney*—Fulwider, Patton, Rieber, Lee & Utecht

[57] ABSTRACT

A differential coding system and method for use in a data communications system employing phase ambiguous coherent detection. The system and method includes differentially encoding a plurality of dibits through a plurality of differential encoders and corresponding outputs of the encoders into new dibit combinations before converting the new combinations to analog signals for transmission. In the receiving decoder, the process is reversed to recover the original dibits.

30 Claims, 7 Drawing Figures

Patented May 30, 1972 3,666,890

3 Sheets-Sheet 1

INVENTOR.
FRED B. WADE
BY Fulwider, Patton, Rieber, Lee, and Utecht
ATTORNEYS

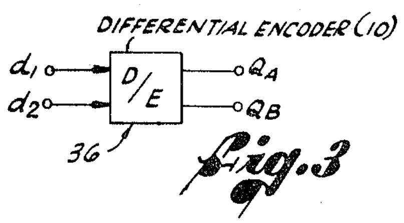
Fig. 3
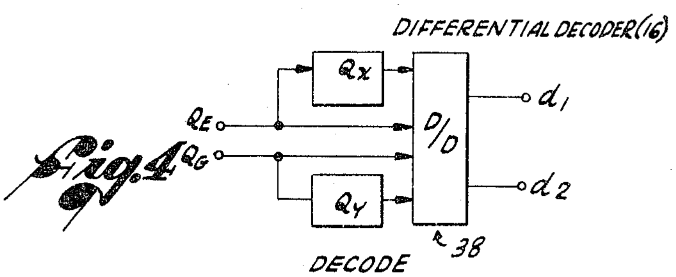
Fig. 4
ENCODE
| $d_1$ (tn) | $d_2$ (tn) | $Q_A$ (tn) | $Q_B$ (tn) | $Q_A$ (tn+1) | $Q_B$ (tn+1) |
|---|---|---|---|---|---|
| 0 | 0 | 0 | 0 | 0 | 0 |
| 0 | 1 | 1 | 0 | | |
| 1 | 0 | 0 | 1 | | |
| 1 | 1 | 1 | 1 | | |
| 0 | 0 | 0 | 1 | 0 | 1 |
| 0 | 1 | 0 | 0 | | |
| 1 | 0 | 1 | 1 | | |
| 1 | 1 | 1 | 0 | | |
| 0 | 0 | 1 | 0 | 1 | 0 |
| 0 | 1 | 1 | 1 | | |
| 1 | 0 | 0 | 0 | | |
| 1 | 1 | 0 | 1 | | |
| 0 | 0 | 1 | 1 | 1 | 1 |
| 0 | 1 | 0 | 1 | | |
| 1 | 0 | 1 | 0 | | |
| 1 | 1 | 0 | 0 | | |
Fig. 3A
DECODE
| $Q_E$ (tp) | $Q_G$ (tp) | $Q_X$ (tp) | $Q_Y$ (tp) | $d_1$ (tp) | $d_2$ (tp) |
|---|---|---|---|---|---|
| 0 | 0 | 0 | 0 | 0 | 0 |
| 0 | 1 | 0 | 1 | | |
| 1 | 0 | 1 | 0 | | |
| 1 | 1 | 1 | 1 | | |
| 0 | 0 | 1 | 0 | 0 | 1 |
| 0 | 1 | 0 | 0 | | |
| 1 | 0 | 1 | 1 | | |
| 1 | 1 | 0 | 1 | | |
| 0 | 0 | 0 | 1 | 1 | 0 |
| 0 | 1 | 1 | 1 | | |
| 1 | 0 | 0 | 0 | | |
| 1 | 1 | 1 | 0 | | |
| 0 | 0 | 1 | 1 | 1 | 1 |
| 0 | 1 | 1 | 0 | | |
| 1 | 0 | 0 | 1 | | |
| 1 | 1 | 0 | 0 | | |
Fig. 4A
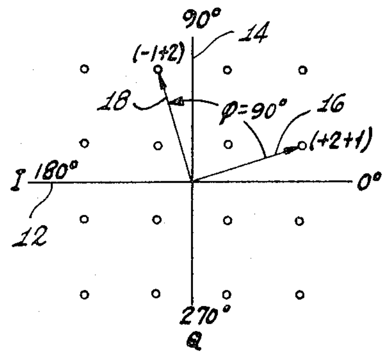
Fig. 2
INVENTOR.
FRED B. WADE
BY Fulwider, Patton, Rieber, Lee, and Utecht
ATTORNEYS

INVENTOR.
FRED B. WADE

BY Fulwider, Patton, Rieber Lee, and Utecht
ATTORNEYS

DIFFERENTIAL CODING SYSTEM AND METHOD

BACKGROUND OF THE INVENTION

1. Field of the Invention

The present invention relates generally to differential coding systems for communications systems and, more particularly, to a differential coding system and method whereby data may be transmitted and received regardless of a multiple phase ambiguity in a receiving coherent detector system.

2. Description of the Prior Art

Heretofore, communications systems employing coherent detection in the receiver section normally used locally generated demodulation carriers which might be out of phase by a predetermined phase angle with the transmitting carrier. This phenomenon could result in a phase ambiguity and erroneous demodulation. One conventional method of solving the phase ambiguity problem is the transmission of a low level reference carrier, or a pilot tone, containing transmitting carrier phase information. The received reference carrier, or pilot tone, is then used to maintain the locally generated carrier in phase with the transmitting carrier. For other systems, particularly phase modulation systems, a differential coding system is used so that the phase ambiguity could be disregarded.

While the differential coding systems of the prior art are adequate to solve the phase ambiguity problems of relatively simple data transmission systems, such prior art systems can not successfully be used for communications systems which utilize multi-channel transmission on a single carrier with multiple signal levels in each channel. Such modulation systems normally have as an object the concentration of substantially all of the carrier energy in the information signals with substantially no reference carrier or pilot tone. In such systems, there may be a multiple phase ambiguity between the transmitting carrier and the locally generated demodulation carrier without a conventional means to resolve the ambiguity.

Thus, there has long been a need for differential coding methods and techniques for multiple channel, multi-level per channel data communications systems which have an unresolvable multiple phase ambiguity in their receiving sections. The present invention fulfills this need.

SUMMARY OF THE INVENTION

The present invention provides a differential encoding system and method for multi-channel, multi-level per channel communications systems whereby original data information may be recovered from a receiver utilizing coherent detection regardless of a multiple phase ambiguity between the locally generated demodulating carrier and the transmitting carrier.

The presently preferred embodiment of the coding system and method described below is intended for use in a data communications system utilizing double-sideband, suppressed-carrier, quadrature, amplitude-modulation with four (or more) analog voltage levels in each of two channels. A form of coherent detection is employed in which a locally generated reference carrier is locked with a phase relationship with respect to the transmitting carrier of either 0°, 90°, 180° or 270°. No carrier reference signals or pilot tones are transmitted so that it is necessary to recover the transmitted information regardless of the phase ambiguity. In this modulation system, the coding system and method of the invention includes differentially encoding four (or more) data bits in dibit pairs and combining corresponding outputs of the encoders to form new dibit combinations before converting the new dibit combinations to corresponding analog voltages for transmission in each channel of the communications system. In the receiving decoder, the process is reversed and the original dibits are recovered regardless of the multiple phase ambiguity.

While the differential coding system of the invention is described below with reference to a double-sideband, suppressed-carrier, quadrature, amplitude-modulation system, it should be appreciated that the basic method of this invention; differentially encoding in dibit pairs, and combining corresponding outputs of the encoders to form new dibit combinations before transmission, and reversing the process on reception; is applicable to any system utilizing simultaneous transmission in two channels with multi-level signals in each channel for each transmission interval. Thus, the differential encoding system of the invention could very well be applied to any of the other commonly utilized methods of modulation such as frequency-modulation or phase-modulation, in a proper system.

The above and other advantages of the invention will become apparent from the following more detailed description, when taken in conjunction with the accompanying drawings of illustrative embodiments.

DESCRIPTION OF THE DRAWINGS

FIG. 2 is a vector diagram illustrating the effect of phase ambiguity in the communications system in which the differential coding system of the present invention is utilized;

FIG. 3 is a block diagram of a differential encoder suitable for use in the coding system of the invention;

FIG. 3A is an encoding table for the differential encoder of FIG. 2;

FIG. 4 is a a block diagram of a differential decoder suitable for use with the invention;

FIG. 4A is a decoding table for the differential decoder of FIG. 4; and

DESCRIPTION OF THE PREFERRED EMBODIMENT

Figure 1:
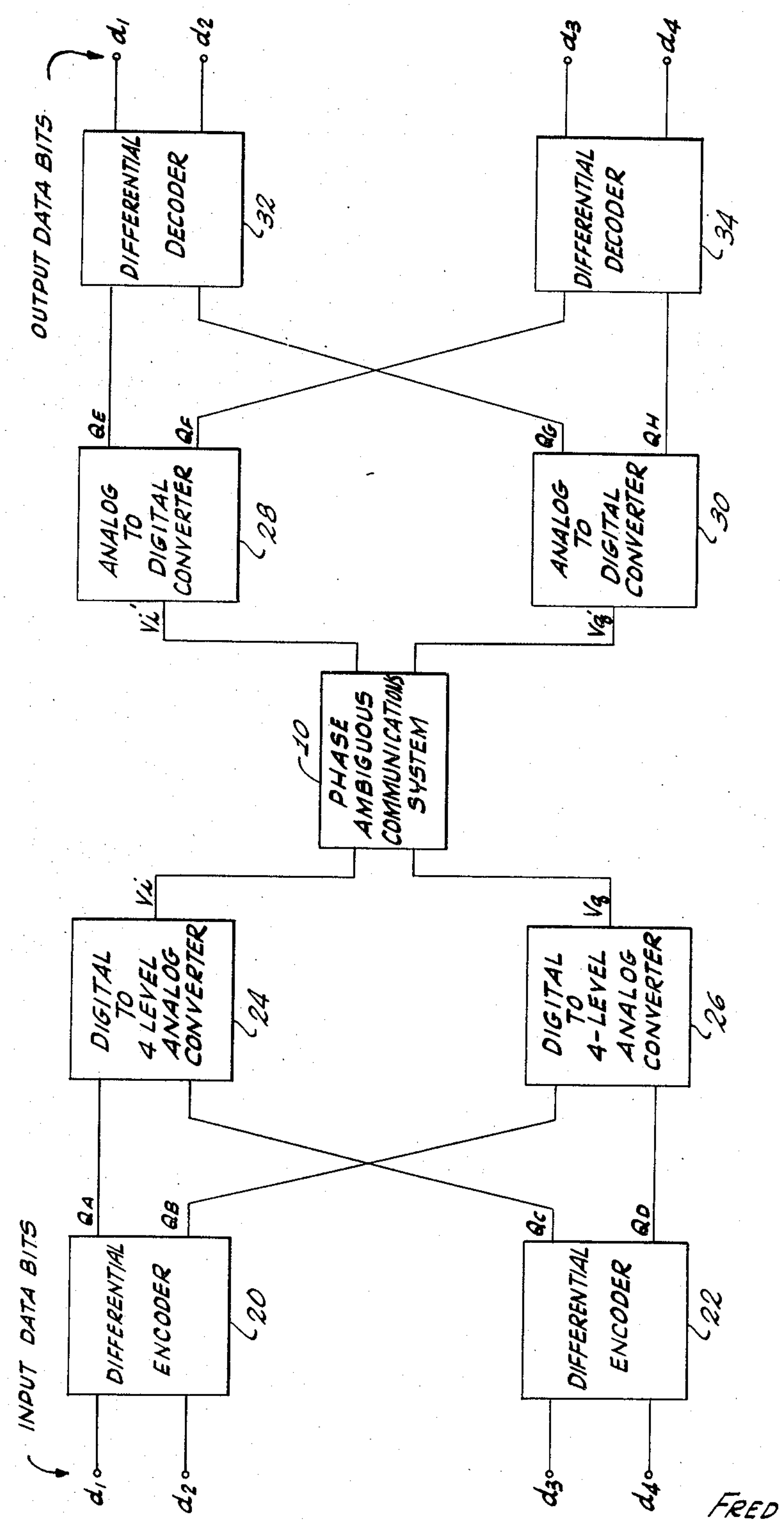
FIG. 1 is a block diagram of a communications system utilizing the differential coding system of the present invention.

Turning now to the drawings, and particularly FIG. 1 thereof, the coding system of the present invention is adapted for use in a phase ambiguous communications system 10. As noted above, the communications system 10 employs double-sideband, suppressed-carrier, quadrature, amplitude-modulation. Four distinct analog voltage levels may be transmitted in each of the "in-phase" and "quadrature-phase" channels. A form of coherent detection is employed in which a locally generated reference carrier is locked with a phase relationship of either 0°, 90°, 180°, or 270° with respect to the transmitting carrier. The communications system 10 employs no reference carrier signals or pilot tones so that it is not possible to determine which phase relationship the coherent detection system has locked onto, thereby creating the phase ambiguity.

The results of the phase ambiguity are illustrated by means of the vector diagram shown in FIG. 2. For the purposes of this discussion, it will be assumed that the four analog voltage levels possible in the in-phase channel of the communications system 10 may be represented by one of four positions along the abscissa 12 of the diagram. The abscissa 12 will be more relevantly called the in-phase channel 12 hereinafter. While the actual voltage level utilized in the communications system 10 may be chosen in accordance with conventional and practical techniques well known in the art, it will be assumed, for the purposes of illustration, that the voltage levels are either ± 2 volts or ± 1 volt, resulting in two points on either side of the origin of the diagram of FIG. 3. Similarly, the analog voltages in the quadrature-phase channel of the communications system 10 may be assumed to be four points at ± 2 volts and ± 1 volt along the ordinate axis 14 of the vector diagram. Again, the ordinate axis 14 will be more relevantly called the quadrature-phase channel 4 hereinafter.

The signal transmitted and received by the communications system 10 may be considered to be the vector sum of the instantaneous voltages appearing in the in-phase channel 12 and the quadrature-phase channel 14 of the vector diagram of FIG. 3. For example, assume that the signal in the in-phase channel 12 has an analog voltage value of + 2 and the signal in the quadrature-phase channel 14 has a voltage of + 1. Assuming that the modulated carrier is correctly received with a 0° phase difference between the transmitting carrier and the locally generated carrier, the transmitted and received signal can be thought of as a vector 16 displaced from the 0° axis of the vector diagram by an amount resulting in a + 2 value in the in-phase channel 12 and + 1 in the quadrature-phase channel 14.

The effect of the phase ambiguity discussed above is graphically illustrated by considering what happens to a received signal when the phase of the local carrier is displaced by 90° from the transmitting carrier. The received signal vector 16 is also displaced by 90° resulting in a new vector 18. It can be seen that the new vector 18 represents a signal voltage level of −1 in the in-phase channel 12 and voltage level of +2 in the quadrature-phase channel 14.

Since the coherent detection system utilized in the communications system 10 has a local carrier which may lock with a phase relationship with respect to the transmitting carrier of 0°, 90°, 180° or 270°, it will be apparent that each instantaneously received signal vector (e.g. 16) may be received in four different positions on the vector diagram of FIG. 3. Considering that there are four possible signal levels in each of the channels 12, 14, resulting in 16 possible vectors for each transmission interval, each of which may be received in four different positions on the vector diagram of FIG. 3, it will be appreciated that the task of correctly decoding the signals received by the communications system 10 is formidable indeed.

By using the differential coding system of the present invention, it is possible to transmit and receive a plurality of data bits in each transmission interval regardless of the four way phase ambiguity. As illustrated in FIG. 1, the basic coding technique includes differentially encoding pairs of bits *d*1–*d*2, *d*3–*d*4, or "dibits," in individual differential encoders 20 and 22, respectively. One output bit of each differential encoder 20, 22 ($Q_B$ and $Q_C$ is combined or paired with the corresponding output bit of the other encoder and the new dibit combinations are then converted to corresponding analog voltage levels by means of digital-to-four-level analog converters 24 and 26, respectively.

While the new combinations of dibits are converted to analog voltage levels for use in the communications system 10 described above, it should be appreciated that this is a presently preferred embodiment and that the general differential encoding and digital-to-analog conversion could be utilized in other communications systems such as a phase-modulation system utilizing multiple phase shifts in each channel.

The output of the digital-to-analog converters 24 and 26 are designated $V_i$ and $V_q$ and are fed into the generalized in-phase and quadrature-phase channels, respectively, of the communications system 10. Because of the phase ambiguity in the communications system 10, the received analog voltage levels may or may not be the same as the transmitted levels and are thus designated $V_i'$ and $V_q'$. In the receiver, the analog voltage levels $V_i'$ and $V_q'$ are converted to dibit pairs by means of analog-to-digital converters 28 and 30 respectively. The outputs of the analog-to-digital converters 28 and 30 are designated $Q_E$ through $Q_N$ and one bit of each converter ($Q_F$ and $Q_G$) is combined or paired with the corresponding bit of the other converter to form new dibit combinations which are fed to a pair of differential decoders 32 and 34, respectively. The outputs of the differential decoders 32 and 34 are the original data bits d1 through d4.

While the exact nature of the operation of the differential coding system of the present invention, which results in the correct transmission and reception of a plurality of data bits for each transmission interval despite the four way phase ambiguity is not clearly understood, there are certain criteria and conditions of operation which have been observed and appear to be necessary for the proper operation of the system. Certain of these criteria are illustrated in FIGS. 3, 3A, 4 and 4A.

FIG. 3 is a block diagram of a generalized differential encoder 36 and has input data bits *d*1 and *d*2 as a dibit and has a dibit output $Q_A$ and $Q_B$. While the differential encoder 36 has inputs and outputs corresponding to the differential encoder 20, it should be noted that the description of the operation of the differential encoder 36 is equally applicable to either of the differential encoders 20 or 22.

The generalized differential encoder 36 operates according to the encoding table shown in FIG. 3A. Basically, the differential encoder compares its present output designated $Q_A$ and $Q_B$ with the present incoming data bits *d*1 and *d*2 and generates a corresponding $Q_A$ and $Q_B$ for the following bit time. One criteria by which the coding system of the present invention operates is that there be four unique combinations of *d*1, *d*2, and $Q_A$, $Q_B$ at a current bit time ($t_n$) which all will produce one common $Q_A$ and $Q_B$ output for the following bit time ($t_n$+1). Thus, from a consideration of the encoding table of FIG. 3A it can be seen that there are $2^4$ or 16 possible unique combinations for *d*1, *d*2, $Q_A$ and $Q_B$. There are then available four unique combinations for each of the four possible $Q_A$ and $Q_B$ output combinations at the following bit time. The logical implementation of the generalized differential encoder 36 into the differential encoders 20 and 22 is conventional and will be apparent to those having ordinary skill in the art.

The four outputs $Q_A$, $Q_B$, and $Q_C$, $Q_D$ of the differential encoders 20 and 22, respectively must be combined to new dibit pairs prior to their conversion to analog voltage levels, as discussed above. Thus, the input to the digital-to-four-analog converter 24 is the $Q_A$ output from the differential encoder 20 and the $Q_C$ output from the differential encoder 22. Similarly, the input to the digital-to-four-level-analog converter 26 is the $Q_B$ output from the differential encoder 20 and the $Q_D$ output from the differential encoder 22.

The digital-to-four-level-analog converters 24 and 26 convert the four possible dibit input combinations to four possible voltage levels. As was briefly discussed above, the actual voltage levels employed or the relationship to the particular dibit combinations is of no importance to the present invention. Thus, the digital-to-four-level-analog converters 24 and 26 may be implemented for a particular communications system according to techniques well known to those of ordinary skill in the art. It should also be appreciated that the four voltage level outputs from the converters 24 and 26 are to be utilized as the in-phase and quadrature-phase signals in the communications system 10 is a presently preferred embodiment for that particular communications system. It should be appreciated that the digital-to-analog converters 24 and 26 could develop an appropriate four output signals of any type needed for a particular communications system in which the coding system of the present invention could be advantageously employed. For example, the digital-to-analog converters 24, 26 could produce output signals which could be utilized by a phase-modulation communication system, should that be desired.

In the presently preferred embodiment of the coding system of the invention, the outputs $V_i$ and $V_q$ of the digital-to-analog converters 24 and 26, respectively are used to modulate the in-phase and quadrature-phase channels, respectively, of the communications system 10. The receiving portion of the communications system 10 produces outputs of $V_i'$ and $V_q'$ which may or may not be the same as the inputs $V_i$ and $V_q$ of the system depending on the phase relationship between the locally generated carrier and the transmitting carrier of the system. The output $V_i'$ and $V_q'$ are related however in that they represent a signal vector 16, such as that shown in FIG. 2, shifted by 0°, 90°, 180° or 270°. These output voltages $V_i'$ and $V_q'$ must be converted to the original data bits d1 through *d*4. This accomplished by first converting the voltages $V_i'$ and $V_q'$ to corresponding dibits $Q_E$, $Q_F$ and $Q_G$, $Q_H$,respectively, by means of analog-to-digital converters 28 and 30, respectively. The analog-to-digital converters 28, 30 are implemented by well known techniques and the only requirement is that the voltage levels and the dibit combinations correspond to those used in the digital-to-analog converters 24, 26.

The output $Q_E$, $Q_F$ and $Q_G$, $Q_H$, of the analog-to-digital converters 28, 30, respectively, are again recombined into new dibit pairs before they are differential decoded. Thus, the output $Q_E$ of analog-to-digital converter 28 is combined with the output $Q_G$ of the analog-to-digital converter 30 to form the input dibit to the differential decoder 32. Similarly, the output $Q_F$ of the analog-to-digital converter 28 is combined with the output $Q_H$ of the analog-to-digital converter 30 to form the input dibit to the differential decoder 34.

The input dibits are differential decoded by means of the generalized differential decoder 38 shown in FIG. 4 and the decoding table shown in FIG. 4A. While the input $Q_E$ and $Q_G$ and the outputs d1 and d2 of the generalized differential decoder 38 correspond to the inputs and outputs of the differential decoder 32, it will be appreciated that the description of the operation of the generalized differential decoder is equally applicable to both differential decoders 32 and 34. Again, the logical implementation for the differential decoder 38 is accomplished according to techniques well known to those skilled in the art and the present dibit Q $Q_E$, $Q_G$ (at $t_p$) is logically combined with the prior dibit combination $Q_X$, $Q_Y$ to form the present output $d1$, $d2$ (at $t_p$).

The criteria for the decoding is essentially the same as the criteria for encoding in that four unique combinations of $Q_E$, $Q_G$ and $Q_X$, $Q_Y$ all produce only one output dibit combination d1, d2. It will be apparent from a consideration of the encoding and decoding tables FIG. 3A and FIG. 4A, respectively, that the four unique combinations which produce a particular output combination are the same for both the encoding and decoding tables. This is a further criteria for the encoding system of the present invention.

While a particular four unique combinations to produce a single output combination is shown in the encoding and decoding tables FIG. 3A and FIG. 4A, respectively, it is contemplated that there are other combinations of the 16 possibilities for the four inputs which will produce the same results. Thus, the unique combinations are preferably selected to reduce the local implementation of the differential encoders 20 and 22 and differential decoders 32, 34.

While the exact theory of operation of the coding system of the present invention is not known, it appears that the combination of the differentially encoded dibits into new dibit combinations results in outputs $V_i$ and $V_q$ of the digital-to-analog converters 24 and 26 which are each functions of all four of the input data bits d1 through $d4$. It also appears that the received voltage levels $V_i'$ and $V_q'$ would also have to be functions of those four data bits because the received voltage levels $V_i'$ and $V_q'$ are themselves vectorially related. The analog-to-digital conversion followed by combination into new dibit combinations before differential decoding then results in correctly decoding the received voltage levels $V_i'$ and $V_q'$ regardless of the possible four way phase ambiguity.

Figure 5:
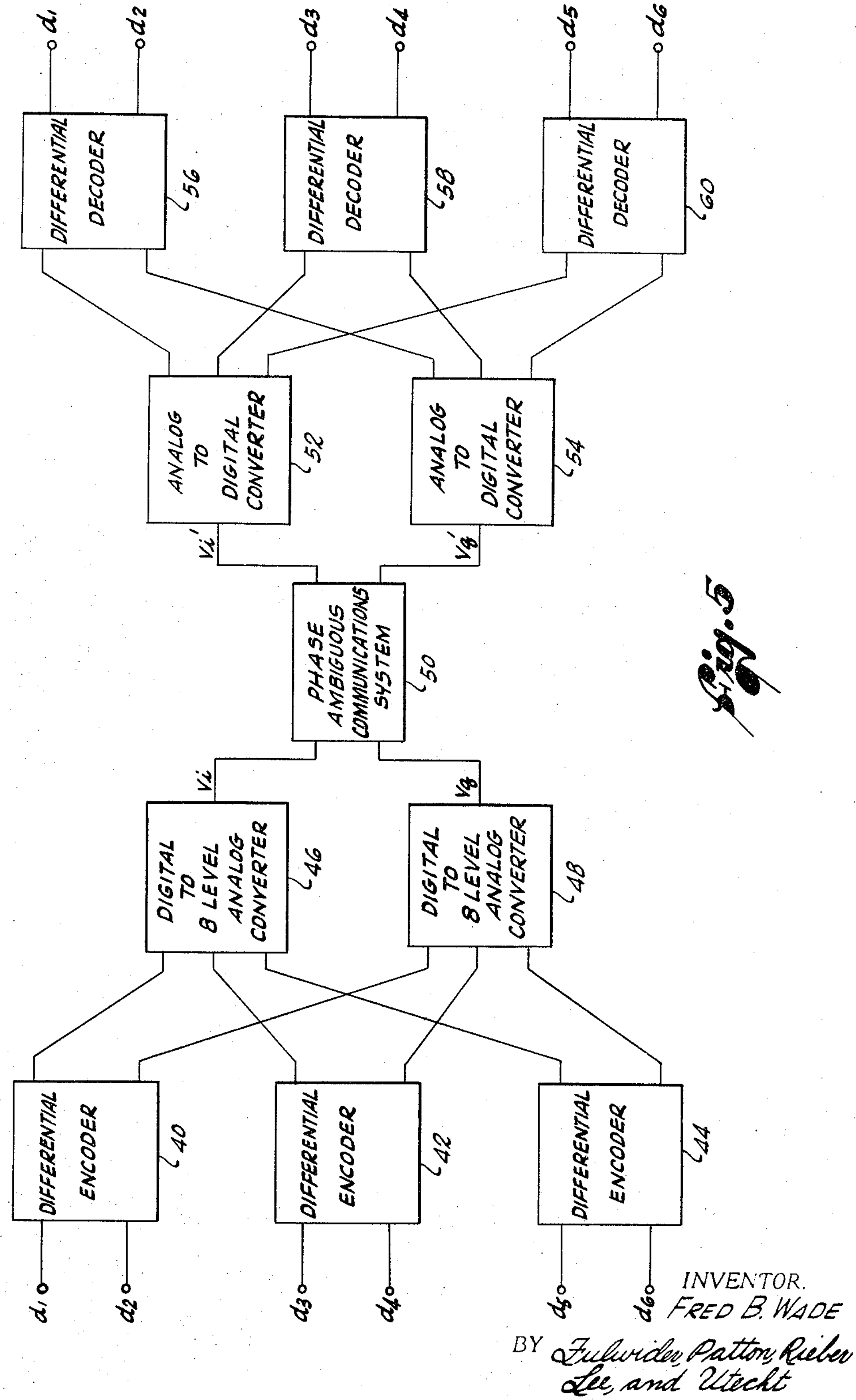
FIG. 5 is a block diagram of a communications system utilizing a second species of the differential coding system of the present invention.

When the criteria for proper operation of the coding system of the present invention is considered, it can be seen that the coding system of the invention can be expanded to the case of an n data bit input to the system so long as there are an even number of input data bits so that they can be separated into dibits. FIG. 5 shows the arrangement of the coding system of the present invention for a six data bit input. The data bits are separated into three dibits, $d1$, $d2$; $d3$, $d4$ and $d5$, $d6$. The three dibit inputs are then differentially encoded by means of the differential encoders 40, 42 and 44. Again, corresponding outputs of the differential encoders 40, 42 and 44 are combined as new inputs to digital-to-eight-level-analog converters 46 and 48. The eight level outputs $V_i$ and $V_q$ of the digital-to-analog converters 46 and 48 respectively, are then used as inputs to a general communications system 50 which may be realizable using present technology.

Assuming that the communications system 50 can produce outputs $V_i'$ and $V_q'$ which may or may not be the same as the inputs $V_i'$ and $V_q'$, the outputs $V_i'$, $V_q'$ are fed to analog-to-digital converters 52 and 54 and again, the corresponding outputs of each analog-to-digital converter are combined and fed to three differential decoders 56, 58 and 60 as dibits. The dibit inputs are then differentially decoded by conventional means in accordance with the criteria set forth above to generate the original input data bits d1 through d6 to the system.

Thus, the differential coding system of the present invention is able to encode and decode a plurality of input data bits regardless of a possible four way phase ambiguity in the communications system in which the present coding system is used. While a particular preferred embodiment for a double-sideband, suppressed-carrier, quadrature, amplitude-modulation system having four analog voltage levels in each of two channels has been described in detail, it will be understood that the coding system is applicable to other appropriate generalized communications systems and the invention is not to be limited except by the following claims.

I claim:

1. A differential coding system, comprising:
   - differential encoding means for differentially encoding a plurality of data bits arranged in a first set of dibits, the output of said differential encoding means being a second set of dibits;
   - first combining means for combining corresponding bits of said second set of dibits into first and second bit combinations;
   - first converting means for converting said first and second bit combinations into corresponding analog signals for transmission through a communications system;
   - second converting means for converting analog signals received through the communications system to corresponding third and fourth digital bit combinations;
   - second combining means for combining corresponding bit positions of said third and fourth bit combinations into a third set of dibits; and
   - differential decoding means for differentially decoding said third set of dibits, the output of said differential decoding means being a fourth set of dibits corresponding to said plurality of data bits.

2. The differential coding system defined in claim 1 wherein:
   - said differential encoding means includes a differential encoder for each dibit of said first set of dibits, each of said differential encoders having four unique combinations of current bit time output dibits and input dibits which produce a single unique output dibit at the next following bit time; and
   - said differential decoding means includes a differential decoder for each dibit of said third set of dibits, each of said differential decoders having four unique combinations of current input dibits and immediately prior dibits which produce a single unique dibit output for a current bit time.

3. The differential coding system defined in claim 2 wherein:
   - said unique dibit combinations for each of said differential decoders are the same as said unique dibit combinations for said decoders.

4. The differential coding system defined in claim 1 wherein:
   - the correspondence between dibits and analog signals is the same for both said first and second converting means.

5. The differential coding system defined in claim 4 wherein:
   - said differential encoding means includes a differential encoder for each dibit of said first set of dibits, each of said differential encoders having four unique combinations of current bit time output dibits and input dibits which produce a single unique output dibit at the next following bit time; and
   - said differential decoding means includes a differential decoder for each dibit of said third set of dibits, each of said differential decoders having four unique combinations of current input dibits and immediately prior dibits which produce a single unique dibit output for a current bit time.

6. The differential decoding system defined in claim 5 wherein:

said unique dibit combinations for each of said differential decoders are the same as said unique dibit combinations for said decoders.

7. A differential coding system for use in a communications system having multiple signal levels in each of two channels, the communications system employing a system of coherent detection in which a multiple phase ambiguity results between a locally generated demodulating carrier and the transmitting carrier, said differential coding system comprising:

differential encoding means for differentially encoding a plurality of data bits arranged in a first set of dibits, the output of said differential encoding means being a second set of dibits;

first combining means for combining corresponding bits of said second set of dibits into first and second bit combinations;

first converting means for converting said first and second bit combinations into respective corresponding analog signals for transmission through the two channels of the communications system;

second converting means for converting the received phase ambiguous analog signals to respective corresponding third and fourth digital bit combinations;

second combining means for combining corresponding bit positions of said third and fourth bit combinations into a third set of dibits; and differential decoding means for differentially decoding said third set of dibits, the output of said differential decoding means being a fourth set of dibits corresponding to the plurality of data bits.

8. The differentia coding system defined in claim 7 wherein:

said differential encoding means includes a differential encoder for each dibit of said first set of dibits, each of said differential encoders having four unique combinations of current bit time output dibits and input dibits which produce a single unique output dibit at the next following bit time; and said differential decoding means includes a differential decoder for each dibit of said third set of dibits, each of said differential decoders having four unique combinations of current input dibits and immediately prior dibits which produce a single unique dibit output for a current bit time.

9. The differential decoding system defined in claim 8 wherein:

said unique dibit combinations for each of said differential decoders are the same as said unique dibit combinations for said decoders.

10. A differential coding system as defined in claim 7 wherein:

the correspondence between dibits and analog signals is the same for both said first and second converting means.

11. The differential coding system defined in claim 10 wherein:

said differential encoding means includes a differential encoder for each dibit of said first set of dibits, each of said differential encoders having four unique combinations of current bit time output dibits and input dibits which produce a single unique output dibit at the next following bit time; and said differential decoding means includes a differential decoder for each dibit of said third set of dibits, each of said differential decoders having four unique combinations of current input dibits and immediately prior dibits which produce a single unique dibit output for a current bit time.

12. The differential decoding system defined in claim 11 wherein:

said unique dibit combinations for each of said differential decoders are the same as said unique dibit combinations for said decoders.

13. For use in a double!-sideband, suppressed-carrier, quadrature, amplitude-modulation system in which four analog voltage levels may be transmitted in each of two channels, the communications system employing a coherent detection system in which a locally generated carrier has a phase difference with respect to the transmitting carrier of 0°, 90°, 180° or 270° possibly resulting in received analog voltage levels being different than transmitted analog voltage levels, a differential coding system comprising:

means for differentially encoding four data bits arranged in a first pair of dibits, the output of said means for differentially encoding being a second pair a double-sideband, dibits;

first combining means for combining corresponding bits of said second pair of dibits into a third pair of dibits;

means for converting said third pair of dibits to two four-level analog voltages to be transmitted through respective channels of the communications system;

means for converting the possibly phase ambiguous received four-level analog voltage signals to a fourth pair of dibits;

means for combining corresponding bits of said fourth pair of dibits to form a fifth pair of dibits and means for differentially decoding said fifth pair of dibits to form a sixth pair of dibits corresponding to the four data bits.

14. A differential coding system as defined in claim 13 wherein:

said means for differentially encoding includes a differential encoder for each of said first pair of dibits, there being four unique combinations of a current output dibit and input dibit for each of said encoders which produces a single unique output dibit for the next following bit time; and said means for differentially decoding includes a differential decoder for each of said fifth pair of dibits, there being four unique combinations of current dibit inputs and immediately prior dibits which result in a single unique current dibit output from each of said decoders.

15. The differential coding system of claim 14 wherein:

the four unique dibit combinations which produce a single unique output combination for said encoders is the same as the four unique combinations of dibits which produce a single unique output dibit for said decoders.

16. The differential coding system of claim 13 wherein:

the dibit to analog voltage level correspondence is the same for both of said first and second means for converting.

17. A differential coding system as defined in claim 16 wherein:

said means for differentially encoding includes a differential encoder for each of said first pair of dibits, there being four unique combinations of a current output dibit and input dibit for each of said encoders which produces a single unique output dibit for the next following bit time; and said means for differentially decoding includes a differential decoder for each of said fifth pair of dibits, there being four unique combinations of current dibit inputs and immediately prior dibits which result in a single unique current dibit output from each of said decoders.

18. The differential coding system of claim 17 wherein:

the four unique dibit combinations which produce a single unique output combination for said encoders is the same as the four unique combinations of dibits which produce a single unique output dibit for said decoders.

19. A method of differential coding, comprising:

a first step of differentially encoding a plurality of data bits arranged in a first set of dibits to generate a second set of dibits;

a second step of combining corresponding bits of said second set of dibits into first and second bit combinations;

a third step of converting said first and second bit combinations into corresponding analog signals for transmission through a communications system;

a fourth step of converting received analog signals from the communications system to third and fourth digital bit combinations;

a fifth step of combining corresponding bit positions of said third and fourth bit combinations into a third set of dibits;

a sixth step of differentially decoding said third set of dibits to generate a fourth set of dibits corresponding to the data bits.

20. The method of differential coding as defined in claim 19, wherein:

said first step includes differentially encoding said first set of dibits so that there are four unique combinations of input and output dibits at a current bit time which produce a single unique output dibit at the next following bit time; and said sixth step includes differentially decoding said third set of dibits so that there are four unique combinations of input and immediately prior dibits which produce a single unique output dibit.

21. A method of differential coding as defined in claim 20 including;

providing that said unique combinations of dibits in said first and sixth step are the same.

22. A method of differential coding as defined in claim 19 wherein:

the correspondence between analog signals and bit combinations in said third and fourth steps are the same.

23. The method of differential coding as defined in claim 22, wherein:

said first step includes differentially encoding said first set of dibits so that there are four unique combinations of input and output dibits at a current bit time which produce a single unique output dibit at the next following bit time; and said sixth step includes differentially decoding said third set of dibits so that there are four unique combinations of input and immediately prior dibits which produce a single unique output dibit.

24. A method of differential coding as defined in claim 23 including:

providing that said unique combinations of dibits in said first and sixth step are the same.

25. For use in a double-side band, suppressed-carrier, quadrature, amplitude-modulation system in which four analog voltage levels may be transmitted in each of two channels, the communications system employing a coherent detection system in which a locally generated carrier has a phase difference with respect to the transmitting carrier of 0°, 90°, 180° or 270° possibly resulting in received analog voltage levels being different than transmitted analog voltage levels, a method of differentially encoding, transmitting, receiving and differentially decoding four data bits per transmission interval, said method comprising:

a first step of differentially encoding the four data bits arranged in a first set of dibits to generate a second set of dibits;

a second step of combining corresponding bits of said second set of dibits into first and second bit combinations;

a third step of converting said first and second bit combinations into corresponding analog signals for transmission through the communications system;

a fourth step of converting received analog signals from the communications system to third and fourth digital bit combinations;

a fifth step of combining corresponding bit positions of said third and fourth bit combinations into a third set of dibits; and a sixth step of differentially decoding said third set of dibits to generate a fourth set of dibits, said fourth set of dibits being the original four data bits.

26. The method of differential coding as defined in claim 25, wherein:

said first step includes differentially encoding said first set of dibits so that there are four unique combinations of input and output dibits at a current bit time which produce a single unique output dibit at the next following bit time; and said sixth step includes differentially decoding said third set of dibits so that there are four unique combinations of input and immediately prior dibits which produce a single unique output dibit.

27. A method of differential coding as defined in claim 26 including:

providing that said unique combinations of dibits in said first and sixth steps are the same.

28. A method of differential coding as defined in claim 25 wherein:

the correspondence between analog signals and bit combinations in said third and fourth steps are the same.

29. The method of differential coding as defined in claim 28, wherein:

said first step includes differentially encoding said first set of dibits so that there are four unique combinations of input and output dibits at a current bit time which produce a single unique output dibit at the next following bit time; and said sixth step includes differentially decoding said third set of dibits so that there are four unique combinations of input and immediately prior dibits which produce a single unique output dibit.

30. A method of differential coding as defined in claim 29 including:

providing that said unique combinations of dibits in said first and sixth steps are the same.

* * * * *

PO-1050
(5/69)

UNITED STATES PATENT OFFICE
CERTIFICATE OF CORRECTION

Patent No. 3,666,890 Dated May 30, 1972

Inventor(s) FRED B. WADE

It is certified that error appears in the above-identified patent and that said Letters Patent are hereby corrected as shown below:

Column 7, line 34, after "the" delete "differentia" and insert therefor --differential--.

Column 8, line 1, after "a" delete "double!-sideband" and insert therefor --double-sideband-- line 12, after "pair" delete "a double-sideband" and insert therefor --of--; line 23, after "dibits" and before "and" insert --;-- (a semicolon).

Signed and sealed this 29th day of August 1972.

(SEAL)
Attest:

EDWARD M.FLETCHER,JR.
Attesting Officer

ROBERT GOTTSCHALK
Commissioner of Patents